United States Patent [19]
Adams

[11] 3,911,830
[45] Oct. 14, 1975

[54] PNEUMATIC ROLL STABILIZING SUSPENSION SYSTEM

[76] Inventor: Clarence R. Adams, 666 17th Ave. West, Kirkland, Wash. 98033

[22] Filed: Apr. 11, 1974

[21] Appl. No.: 460,180

Related U.S. Application Data

[63] Continuation-in-part of Ser. No. 313,126, Dec. 7, 1972, abandoned.

[52] U.S. Cl............. 105/164; 105/157 R; 105/176; 105/182 R; 105/199 R; 105/210
[51] Int. Cl.² ..... B61F 3/08; B61F 5/10; B61F 5/24; B61F 5/50
[58] Field of Search.... 105/1 A, 1 R, 3, 4 R, 157 R, 105/158 R, 164, 168, 171, 175 R, 176, 182 R, 190 R, 199 A, 199 R, 210

[56] References Cited
UNITED STATES PATENTS

| | | | |
|---|---|---|---|
| 34,544 | 2/1862 | Wilson | 105/176 |
| 266,607 | 10/1882 | Carter | 105/176 |
| 638,665 | 12/1899 | Green | 105/176 |
| 1,032,348 | 7/1912 | Bettendorf | 105/182 R |
| 1,101,110 | 6/1914 | Wood, Jr. | 105/190 R |
| 1,228,131 | 5/1917 | Pynn | 105/168 |
| 1,277,889 | 9/1918 | Ethridge | 105/182 R X |
| 2,633,811 | 4/1953 | Poage | 105/164 X |
| 2,874,647 | 2/1959 | Candlin, Jr. | 105/171 |
| 3,022,749 | 2/1962 | Voertman et al. | 105/199 R |
| 3,228,349 | 1/1966 | Akitt et al. | 105/175 R |
| 3,557,707 | 1/1971 | Joy | 105/1 R |

FOREIGN PATENTS OR APPLICATIONS

| | | | |
|---|---|---|---|
| 1,235,689 | 6/1971 | United Kingdom | 105/164 |
| 1,530,137 | 6/1970 | Germany | 105/164 |

*Primary Examiner*—M. Henson Wood, Jr.
*Assistant Examiner*—Howard Beltran

[57] ABSTRACT

A railway vehicle suspension system comprising a center truck and guide trucks. The center truck is attached to the car body through a spring system which permits vertical and lateral tilting motion between the truck and car superstructure while maintaining a fixed fore or aft position and restricting lateral motion except for tilting permitted by the springs. The guide trucks are located at each end of the car body and are connected to the center truck by a cushioned drawbar having rate of turn sensing devices attached to the drawbar and to the center truck at the corners. The guide trucks are not mechanically attached to the car body but support the ends of the vehicle on slideable surfaces as the guide trucks follow tangent or curved track. Angle of superstructure tilt is determined by the rate-of-turn sensors which sense the combined effect of vehicle speed and track curvature and control the pressure in fluid springs in combination with pressure balanced control valves to shift the superstructure center of gravity location so that the centrifugal forces are continuously balanced out.

8 Claims, 12 Drawing Figures

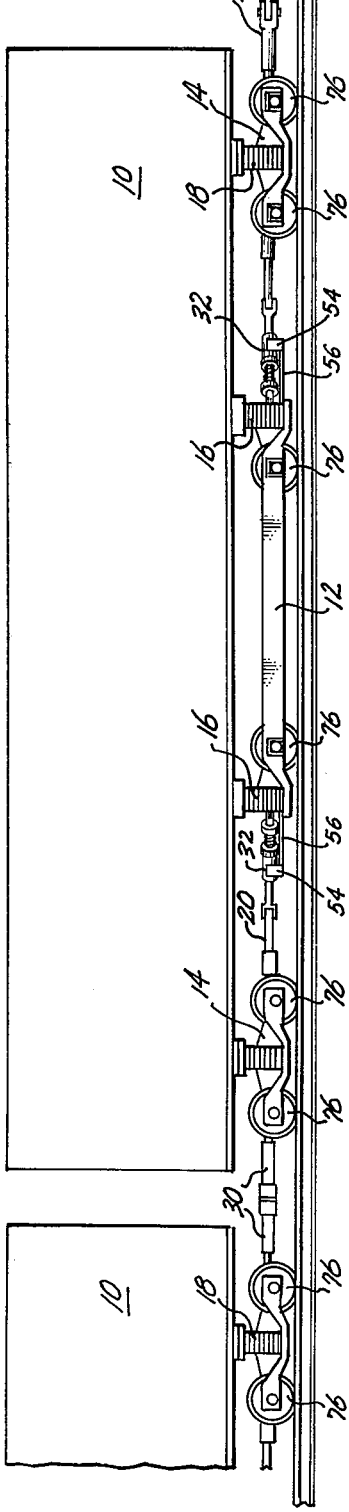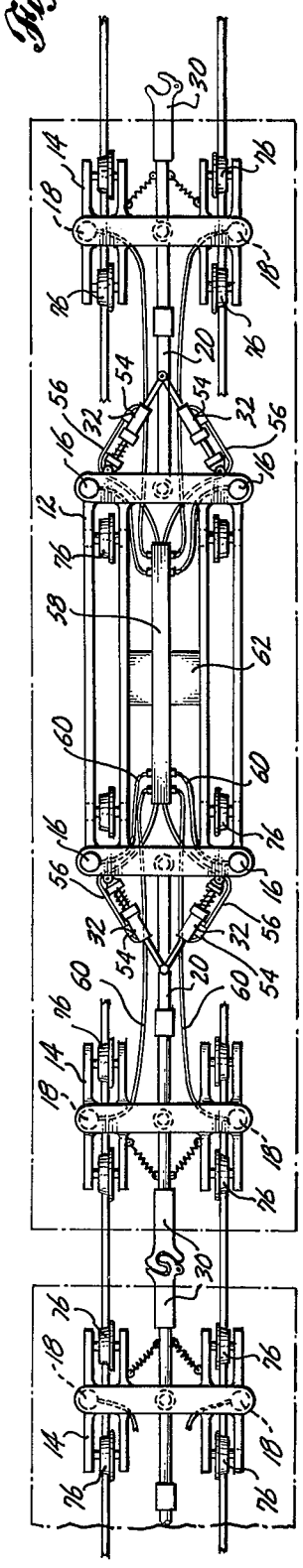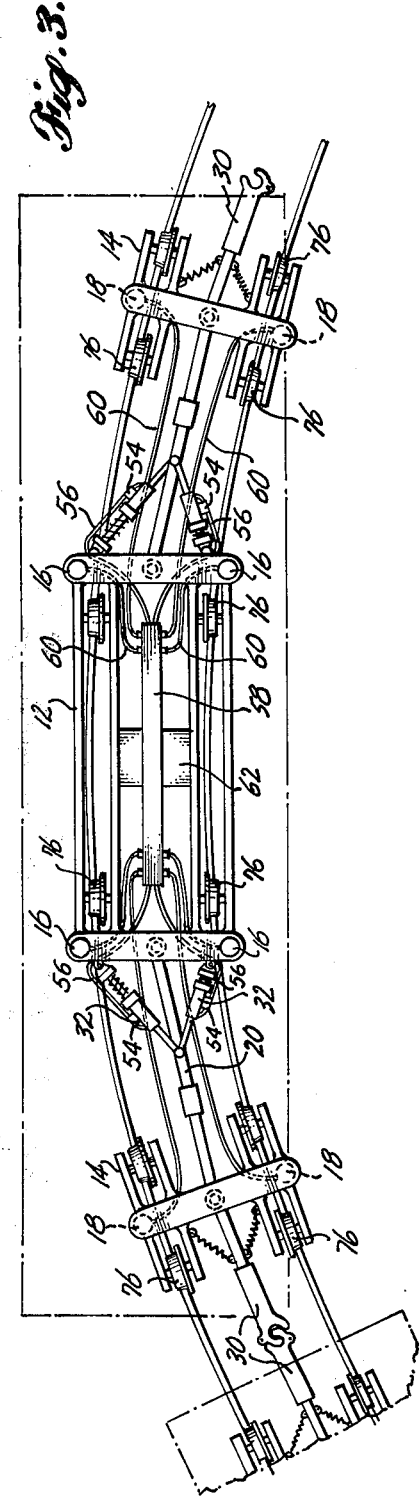

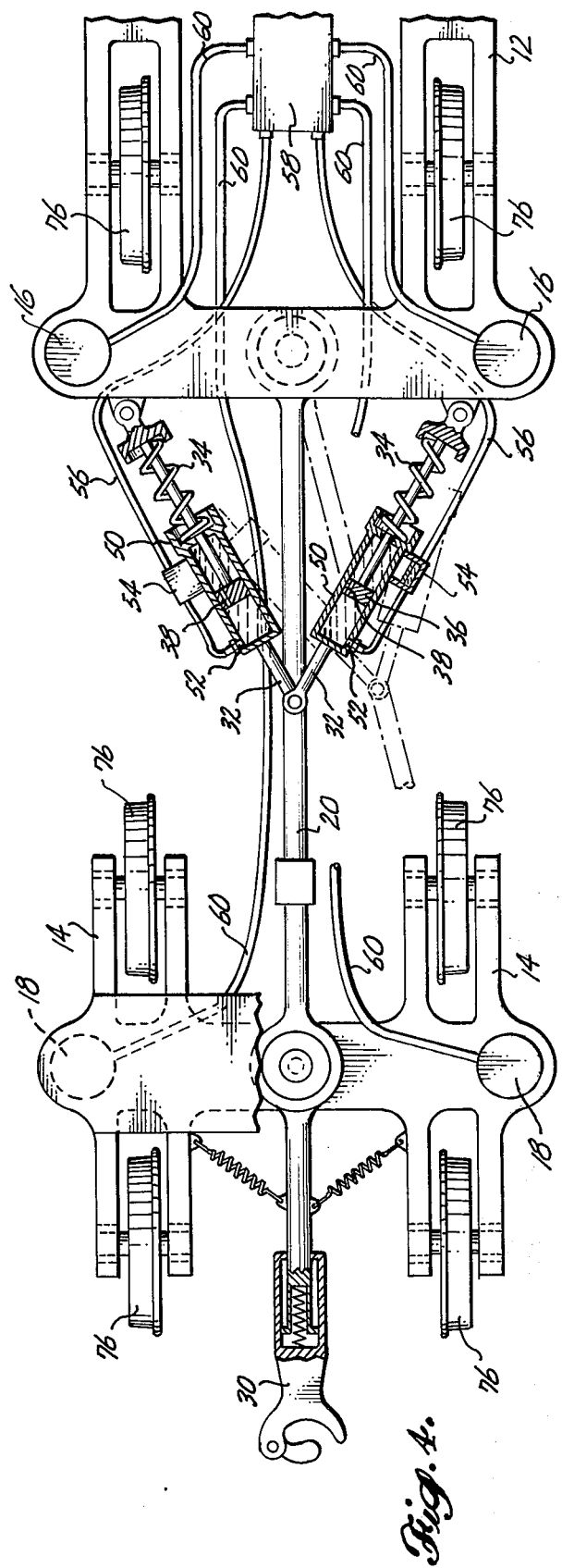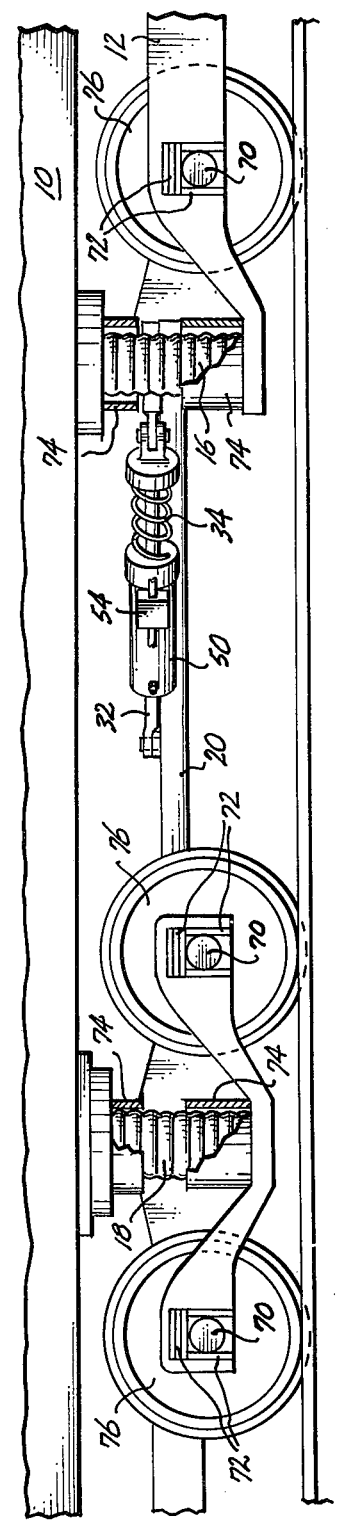

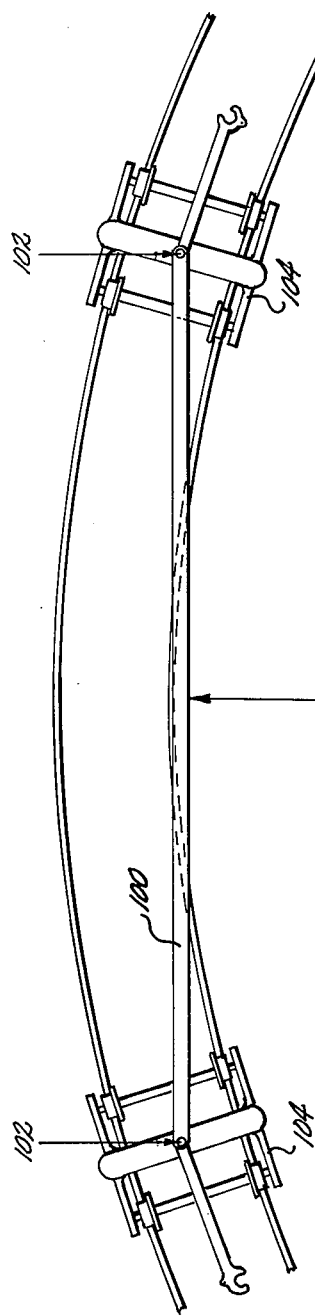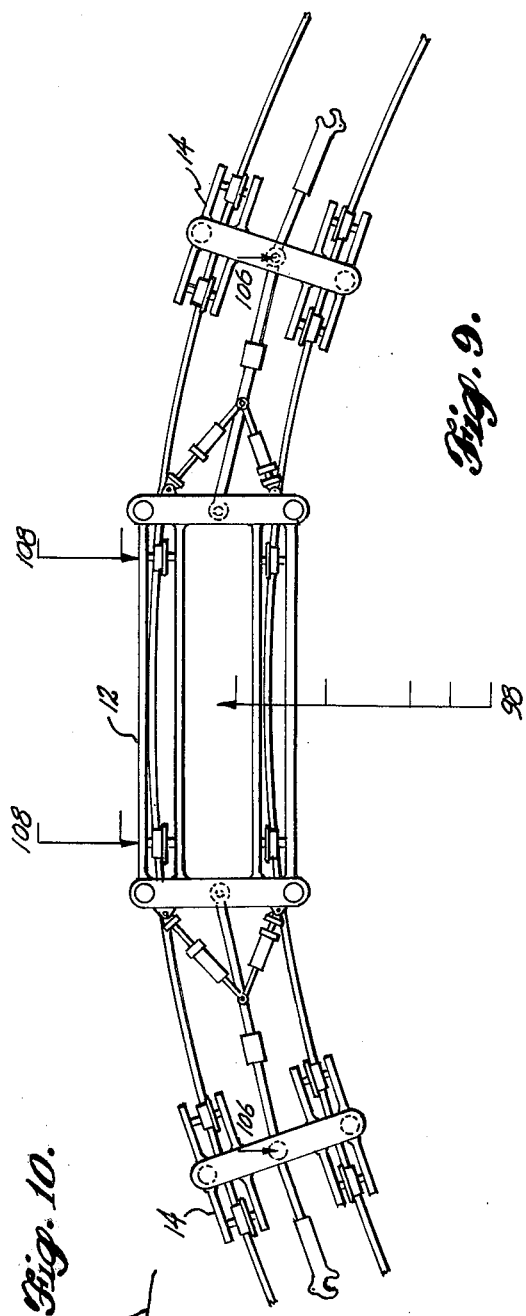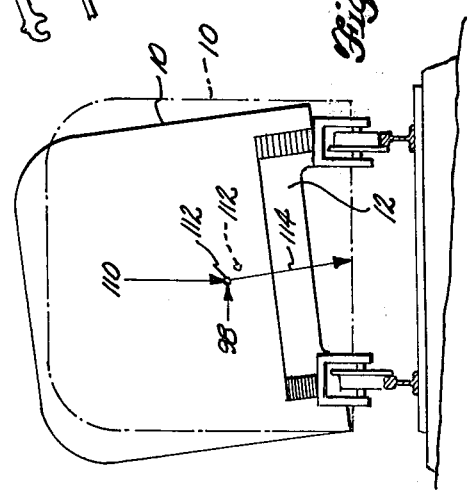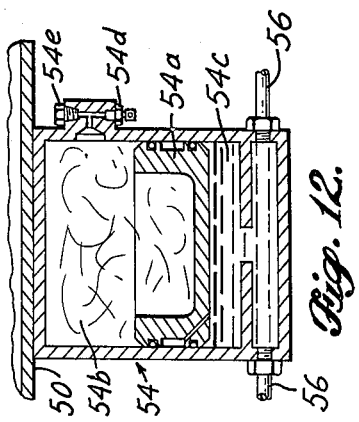

PNEUMATIC ROLL STABILIZING SUSPENSION SYSTEM

This application is a continuation-in-part of application Ser. No. 313,126 filed Dec. 7, 1972, and now abandoned.

FIELD OF THE INVENTION

This invention relates to a suspension system and vehicle banking system for railway vehicles; and more particularly, to the use of guide trucks and rate-of-turn sensors to establish vehicle banking angles.

DESCRIPTION OF THE PRIOR ART

In the design of railway vehicles, suspension systems have traditionally ignored the desirability of controlled banking of the vehicles on curves or have used suspension systems in which centrifugal force, track superelevation, gravity, or wind loads determine the degree of banking. Suspension system such as U.S. Pat. No. 2,874,647 supports the vehicle at both ends at points located at or above the height of the center of gravity so that the vehicle body is suspended like a pendulum. When such vehicles enter a curve at high speed the body swings out by centrifugal force, thereby shifting the center of gravity toward the outside rail which increases wheel and flange loading on that rail. U.S. Pat. No. 2,633,811 provides means for restoring unbalanced loads caused by gravity, centrifugal force, wind or track undilation; however, it does not provide means for tilting the vehicle to compensate for the effects of track curvature and vehicle velocity. Track superelevation activities air spring valves in U.S. Pat. No. 3,022,749 regardless of vehicle velocity. Equalizers carry the load back to the main frame in U.S. Pat. No. 3,228,349 without any means for rotating the vehicle body to compensate for high speed operation on curves. A further drawback of previous rail cars which use trucks on each end for total support is the limitation of radius of curves which a long car can safely negotiate even at slow velocity without derailment.

The conventional art falls short of providing a rail vehicle capable of negotiating curved track at high speeds with safety, minimum cargo damage, maximum passenger comfort, reduced rail wear and minimum wheel loading.

SUMMARY

The preferred embodiment of this invention discloses a rail vehicle having a nonpivoting center truck and a pivoting guide truck at each end of the vehicle for support of the superstructure. Fluid springs, using gases such as air or liquids such as oil for the working fluid, on each truck support the vehicle superstructure and are controlled by rate-or-turn sensors so that the vehicle is banked or held level in accordance with vehicle velocity and degree of track curvature. Rate-of-turn sensors are attached to the drawbars between the center truck and the end guide trucks. Independently suspended wheels, rubber shock mounted, can be free rolling or power driven according to the vehicle requirements. Rate-of-turn sensors shown in the preferred embodiment comprise hydraulic pistons having bleed ports which permit substantial equalization of pressure when the pistons are actuated slowly but restrict flow so that piston pressure builds up in the rate-of-turn sensors pistons on one side of the suspension system and decrease in the rate-of-turn sensor pistons on the opposite side of the rail vehicle suspension system when the vehicle negotiates a turn at high speed. The change in pressure is used to control vehicle banking. Guide trucks equipped with sliding pivots support the vehicle at each and prevent superstructure pitching motion.

In general the present invention comprises a railway vehicle suspension system for supporting and controlling tilt of the superstructure to compensate for track curvature and irregularities by shifting the superstructure center of gravity laterally so that the combination of the vehicle weight and centrifugal force is reacted by a near equal loading on inside and outside rails. A center truck is attached to the superstructure by fluid springs which prevent forward and aft movement of the superstructure while permitting lateral tilting of the superstructure. A pair of guide trucks are each pivotally attached to opposite ends of the center truck by a cushioned drawbar. Each guide truck has a laterally disposed sliding support structure having a center pin and one or more guide truck fluid springs at each end for supporting each end of the superstructure. A slideable means connected at each end on the underside of the superstructure aligns with the sliding support structure on each of the guide trucks to support the superstructure. Rate-of-turn sensing means for control of superstructure lateral tilt are pivotally connected from the center truck to the drawbar between the center truck and each of the guide trucks and sense the rate of horizontal turn through the change in fluid pressure. Suitable actuating means are controlled by the rate-of-turn sensing means for controlling fluid spring force to provide superstructure tilting to counterbalance centrifugal forces so that the combination of the centrifugal force and the superstructure load is reacted primarily as a normal downward force distributed equally between the inside and outside rails on a curve.

Therefore, it is the primary object of this invention to teach the use of a rail vehicle suspension system which permits safe negotiation of sharp curves at high speed by supporting the vehicle superstructure center of gravity longitudinally at the center of the vehicle while controlling lateral shift in the C.G. by rolling the vehicle superstructure into the curve so that vehicle weight is reacted by a near equal loading on inside and outside rails.

It is a further object of this invention to teach the use of a rate-of-turn sensor coupled to guide trucks which control the degree of banking of the vehicle superstructure based on the radius of track curvature and the velocity of the vehicle.

It is a related object of this invention to teach the use of a fixed position short wheelbase center truck to permit tight radius turns on long cars with guide trucks at either end to prevent pitching motion due to overhung loads.

A further related object is to teach a rail vehicle having resiliently mounted independently support wheels so that wheel sliding and hunting are eliminated and the unsprung mass is reduced to a minimum thereby increasing ride quality of the vehicle superstructure.

Accordingly, the above and other objects and features of the invention will become apparent from the following detailed description taken in connection with the accompanying drawings which form a part of the specification.

BRIEF DESCRIPTION OF THE DRAWINGS

FIG. 1 is a side view of the applicant's rail vehicle suspension system supporting a cargo container.

FIG. 2 is a top view of the suspension system and a portion of the control system when the vehicle is operating on tangent track with the vehicle superstructure removed.

FIG. 3 is a top view of the suspension system and a portion of the control system when the vehicle is operating on curved track with the vehicle superstructure removed.

FIG. 4 is a top view showing details of one of the guide trucks, a portion of the center truck, rate-of-turn sensor pistons, drawbar connections, hydraulic accumulators, signal lines, a control box and control lines.

FIG. 5 is a side view showing details of one of the guide trucks, the center truck, rate-of-turn sensor pistons, and drawbar connections.

FIG. 8 is a schematic view showing the centrifugal force vector acting on a conventional rail vehicle having a truck at each end and the resulting reactive forces.

FIG. 9 is a schematic view showing the centrifugal force vector acting on the applicant's rail vehicle suspension system and the resulting reactive forces.

FIG. 10 is a schematic end view through the center of the applicant's rail vehicle suspension system showing the resultant of active forces when the vehicle is traveling around a curve. Broken line shows the superstructure and center of gravity location when the vehicle is standing still.

FIG. 12 is a cutaway view of the accumulator showing its structure.

DESCRIPTION OF THE PREFERRED EMBODIMENT

Figure 6:
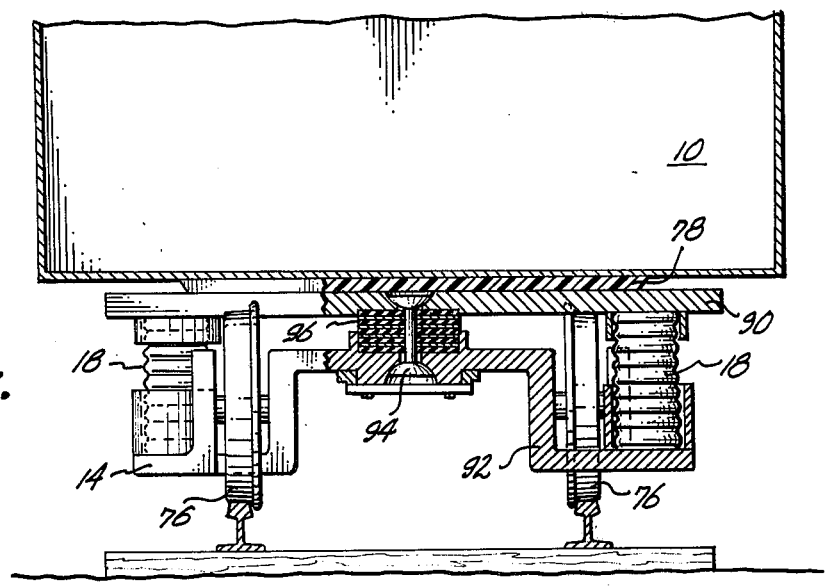
FIG. 6 is an end view of one of the guide trucks when the vehicle is operating on tangent track.

FIG. 1 shows a rail vehicle suspension system with a superstructure 10 mounted on it. The suspension system includes a center truck 12 and two guide trucks. The center truck 12 is attached to the superstructure 10 by means which position the truck 12 relative to the superstructure 10 and prevent movement forward and aft or sideways while permitting cushioning effects of the center truck fluid springs 16 as well as tilting of the superstructure 10. Each guide truck 14 supports one end of the superstructure through guide truck fluid springs 18 and is connected to the center truck 12 through a cushioned drawbar linkage 20. Rate-of-turn sensors 32 are connected to each end of the center truck 12 and the respective cushioned drawbar linkage 20.

The center truck wheel base, which is the distance between wheel centers at one side of the truck, is approximately three times the track gauge to provide good stability without impairing the ability of the vehicle to negotiate sharp curves. Track gauge is understood to be, by persons skilled in the art, the inside distance between the left and right rail of the track. The ratio of wheelbase to gauge can be varied between one and five in accordance with vehicle design requirements.

In FIG. 2 a top plan view of the suspension system on a tangent track is illustrated, while FIG. 3 shows a top plan view of the suspension system on a curved track. The cushioned drawbar linkages 20 which connect the guide trucks 14 to the center truck 12 absorb shocks not taken up by the conventional drawbar and coupler 30 on the ends of the vehicle. The rate-of-turn sensors 32 connected to the center truck 12 and the cushioned drawbar linkage 20 creates a fluid pressure variation when the vehicle suspension system travels around a curve. Pressure variations created by the movement of rate-of-turn sensors 32 can be used to directly control banking of the superstructure 10 on the suspension system by reducing or increasing pressure in the fluid springs 16 and 18 which support the superstructure on the suspension system.

A cutaway view of a rate-of-turn sensor 32 on one end of the center truck 12 is shown in FIG. 4. The other end of the center truck has similar connections; however, it would be possible to control the vehicle superstructure tilting by rate-of turn-sensors 32 on only one end of the center truck 12 or on a single guide truck 14. The rate-of-turn sensors 32 consists of a spring 34 loaded hydraulic piston 36 having a bleed orifice 38 for controlled leakage across the piston 36 operating in a cylinder 50. The cylinder 50 has one or more pressure ports 52 on the end connected to the cushioned drawbar linkage 20. Pressure ports 52 are connected through fluid lines 56 into a distribution and control box 58. The control mechanism in control box 58 is described more specifically later herein with respect to FIG. 11. Generally, this mechanism functions to accomplish the banking or tilting of the vehicle superstructure. However, in the simplest configuration control box 58 would not be required because fluid line 56 could be directly connected to fluid springs 16 and 18. Pressure from the rate-of-turn sensors 32 controls fluid pressure in fluid springs 16 and 18. When the vehicle traverses curved track, the position sensor pistons 36 move an amount proportional to the degree of curvature and at a rate proportional to the vehicle velocity. If the vehicle moves around a curve at low velocity the increase in pressure will be small because fluid in the cylinder 50 will leak across the piston 36 through the bleed orifice 38 without appreciable variation in the pressure which is fed through a signal line 56; therefore, vehicle banking will be minimized. On the other hand if the vehicle moves around a curve at a high velocity, the pressure variation fed through the signal line 56 will be large causing the vehicle to bank proportionally. The arrangement of the rate-of-turn sensors 32 when the vehicle is on tangent track is shown in solid lines and the arrangement of the rate-of-turn sensors 32 when the vehicle is on curved track is shown in dashed lines (see FIG. 4). Of course, it should be realized that in a practical vehicle suspension system design, the superstructure weight and the spring forces required are of such a magnitude that direct supply of pressurized fluid from the rate-of-turn sensor to the fluid springs may not be practical. Therefore, the preferred configuration shown in the drawings includes a hydraulic accumulator 54 having a floating piston 54a separating the gas pressure chamber 54b from the hydraulic fluid chamber 54c with a gas filler valve 54d and safety fuse assembly 54e between the rate-of-turn sensors 32 and the control box 58 and uses the pressure variation from the rate-of-turn sensors 32 as a pressure signal to the control box 58 (see FIG 11). Furthermore, the control box 58 would only in the above configuration contain a conventional pressure boost system comprising at least one state-of-the-art compressor, at least one pressure accumulator or reservoir, and valving means to supply fluid through control lines 60 to fluid springs 16 and 18, thereby controlling fluid spring pressure and regulating superstructure 10 tilt. The control box 58 is supported by suitable means such as a platform 62 attached to the center truck.

FIG. 5 shows the wheel axles 70 mounted in rsilient bearing mounts 72 which absorb and dampen rail impacts. It also shows the location of the fluid spring holders 74 on the trucks and superstructure. The wheels 76 are independently suspended on individual axles 70 so that they do not have to slide, as in conventional rail vehicles, when the vehicle goes around a sharp curve and so that wheel-rail impacts are reduced because of the reduction in unsprung mass.

FIG. 6 shows a view of a guide truck 14 when the vehicle is on tangent track. The superstructure 10 is then centered on the guide truck 14. Slideable bearing surface 78 attached to the vehicle superstructure 10 provides end support for the superstructure 10 by resting on guide truck 14 sliding support structure 90. Slideably bearing surface 78 and sliding support structure 90 can be made of materials having a low coefficient of sliding friction or be designed to be separated by hydrostatic or rolling element bearings. Guide truck sliding support structure 90 is attached to the truck frame 92 by a pin 94 through a stack of resilient and rigid support disks 96 and is positioned at each end by guide truck fluid springs 18.

Figure 7:
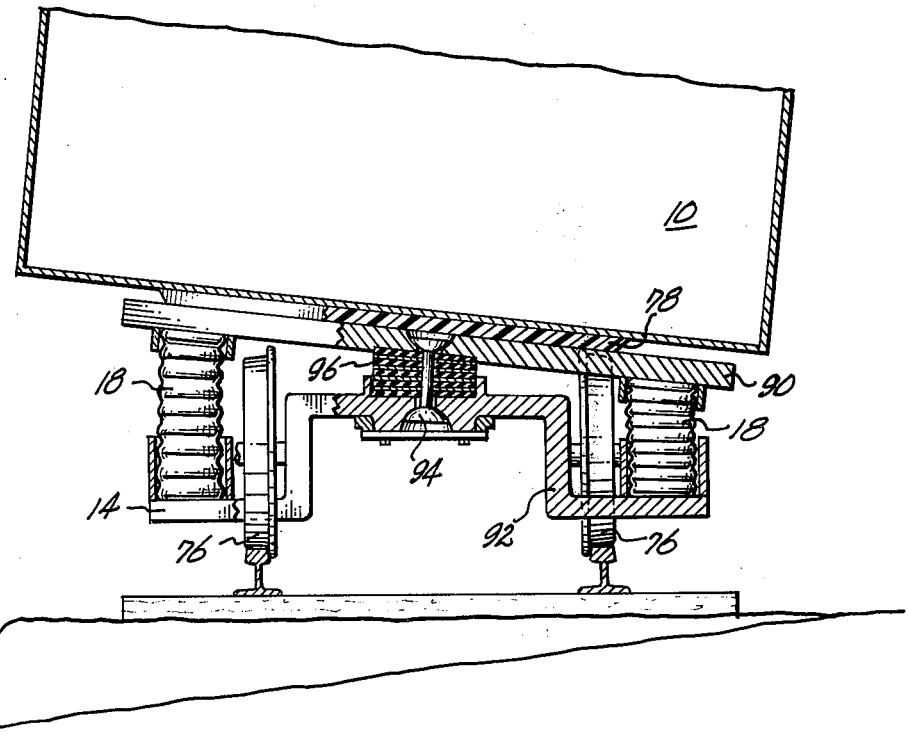
FIG. 7 is an end view of one of the guide trucks when the vehicle is traveling at a high velocity over a curved track without adequate superelevation.

When the vehicle is traveling over a curved track at high speed, the superstructure 10 tilts as indicated in FIG. 7 to compensate for centrifugal force. Bearing surface 78 has been displaced from a centered position on the guide truck sliding support structure 90 due to track curvature, the fluid spring 18 on the inside of the curve is compressed and the fluid spring 18 on the outside of the curve has been extended. The stack of resilient and rigid support disks 96 has been compressed on one side to permit tilting of the sliding support structure 90 in relation to the truck frame 92.

FIG. 8 illustrates the centrifugal force vector 98 acting on a conventional two point suspension system rail vehicle 100 traveling around a curve, and the reacting force vectors 102 acting through the trucks 104 at each end of the vehicle 100.

FIG. 9 illustrates the centrifugal force vector 98 acting on the subject suspension system, the reacting force vectors 106 acting through the guide trucks 14 and reacting force vectors 108 acting through the center truck 12. Therefore, when comparing the force vectors acting on a conventional rail vehicle suspension system with the force vectors acting on the applicant's suspension system, it is obvious that the conventional rail vehicle must react centrifugal force 98 through trucks which are skewed with respect to the vehicle superstructure 10 while on a vehicle using the applicant's suspension system most of the centrifugal force is reacted by the center truck 12 which is aligned with the vehicle superstructure 10 and only a small amount of the centrifual force 98 is reacted through the skewed truck 14. Therefore, when comparing the lengths of the vectors 102 with the lengths of the vectors 106, it becomes clear that the force acting on guide trucks 14 is much smaller than the force acting on the conventional truck 104. Furthermore, the wheels on center truck 12 are essentially parallel to the superstructure 10 while wheels on the conventional truck 104 are skewed with respect to the superstructure 10. Vector 98 contains the sum of reaction forces 106 and 108 as indicated by short horizontal lines. Force vector 98 is equal in magnitude for rail vehicles having a conventional suspension system as illustrated in FIG. 8 and for rail vehicles having a suspension system according to applicant's invention as shown in FIG. 9.

In order to clarify and illustrate the main objectives of this invention the improvement is clearly illustrated by FIG. 10. In this figure the centrifugal 98 and gravity force 110 acting on the center truck in the subject suspension system as the vehicle travels around a curve are compensated for by tilting the superstructure 10 so that its center of gravity 112 is shifted towards the inside rail and the resultant force vector 114 from gravity 110 and centrifugal force 98 penetrates the plane of the rails at the center of the track. Lateral forces due to centrifugal force experienced by the guide trucks 14 are limited to that required to provide guidance of the vehicle around a curve. Thus the objective of stabilizing the vehicle over high speed ranges by reacting most of the gravity and centrifugal forces through the center truck 12 at the track center is achieved and safe, comfortable, high speed operating capability is assured.

Figure 11:
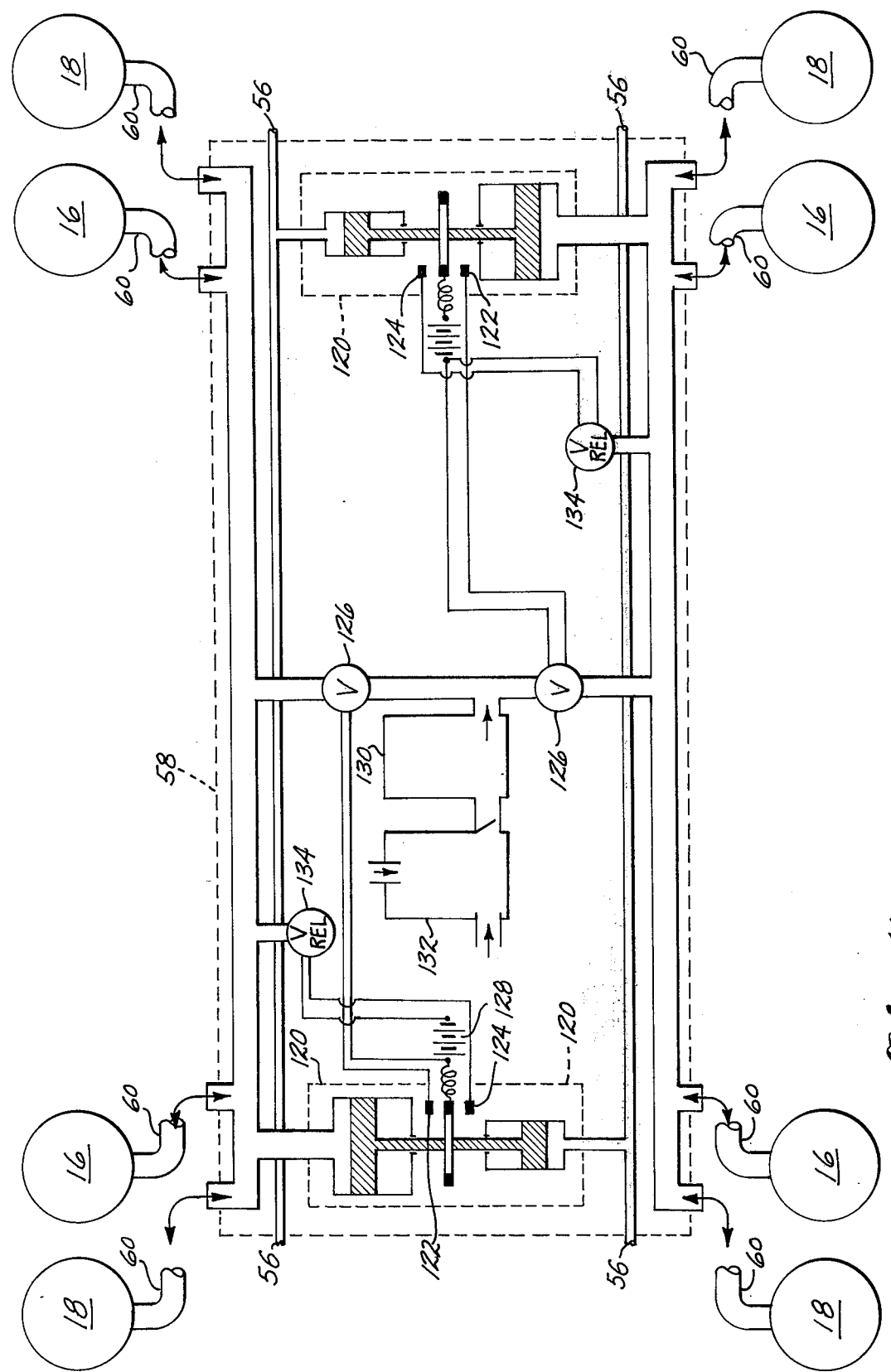
FIG. 11 is a schematic of basic controls in the control box which govern tilt of the vehicle superstructure.

FIG. 11 shows a schematic of the basic controls, contained in control box 58, which cause the vehicle superstructure 10 to tilt in response to pressure variations in the rate-of-turn sensors 32. This central system uses pressure transducers to convert fluid pressure variations into electrical signals and then use electric circuits to control pressure variations in the fluid springs 16 and 18. The control system shown in FIG. 11 uses pressure in line 56, from the rate-of-turn sensor 32, as a command signal which is applied to one end of a pressure balanced control valve 120 while a counterbalancing pressure from fluid springs 16 and 18 on the center truck 12 and guide truck 14 is applied to the opposite end. An electrical source 128, such as a battery, generator or the like is located within box 58 for supplying electric current to switches 122 and 124. If a pressure difference or error in balancing forces occurs the control valve closes switch 122 or switch 124. If switch 122 is closed the pressure in fluid springs 16 and 18 is increased on one side of the vehicle, then valve 126 opens up admitting higher air pressure from accumulator 130 to the fluid springs 16 and 18. Accumulator 130 is kept charged at a predetermined pressure by compressor 132 which may be driven by conventional electric motors or internal combustion engines. If switch 124 is closed, the pressure in fluid springs 16 and 18 is decreased on one side of the vehicle when pressure relief valve 134 opens and bleeds air from fluid springs 16 and 18. The two pressure balanced control valves 120 work in opposite directions to each other so that one valve is set to increase pressure in fluid springs 16 and 18 on one side of the vehicle while the other valve is decreasing pressure in fluid springs 16 and 18 on the opposite side of the vehicle. Pressure from fluid springs 16 and 18 is continuously applied to the pressure balanced control valve 120 where it is controlled in proportion to the command pressure from the rate-of-turn indicator. If the pressure from fluid springs 16 and 18 counterbalances the pressure from the rate-of-turn sensors 32 in control valve 120 then there will be no change in pressure in fluid springs 16 and 18 and the vehicle superstructure 10 will remain in an upright position. When the vehicle travels over a curved track at high speed the vehicle superstructure 10 will tilt into the curve in response to the pressure differentials created in the rate-of turn sensors 32.

In the present invention there is a railway vehicle having a superstructure mounted on a main center truck which is adapted to ride on a rail structure. The main center truck provides primary support for the superstructure; however, a forward guide truck and a rear guide truck, adapted to engage the rail structure, are positioned on opposite ends of the center truck and connected thereto in a manner to permit lateral movement of the guide truck with respect to the center truck while providing secondary support to the ends of the superstructure. Mechanism responsive to relative lateral movement between at least one of the guide trucks is used to tilt the vehicle superstructure laterally to compensate for centrifugal forces on the vehicle.

Many variations and modifications of the concepts disclosed will be apparent in the light of the foregoing description. For example, rate-of-turn sensor mechanisms could be designed using electric signal generators rather than fluidic-mechanical devices. Guide and center trucks could be designed with a different number of wheels. The superstructure could be designed to carry passengers or freight and be streamlined to reduced aerodynamic drag. This concept can be designed as a trailing vehicle or as a self-propelled vehicle.

It should be recognized by persons skilled in the art that the concepts disclosed may have application in vehicles other than conventional dural-rail vehicles. Accordingly, it is intended that the appended claims cover any such variations or modifications.

What is claimed and desired to be secured by U.S. letters patent is:

1. A railway vehicle suspension system for supporting a vehicle superstructure, comprising in combination:
   a center truck pivotally connected between two guide trucks;
   fluid springs mounted between each said truck and said superstructure;
   means for sensing rate of horizontal turn mounted between said center truck and said guide trucks;
   control means connected to said rate sensing means for determining superstructure tilt; and
   actuating means connected between said control means and said fluid springs for regulating fluid springs pressure in each said fluid springs, thereby causing superstructure tilting so that centrifugal forces combined with superstructure load result in a near normal gravity force being applied at the center of an associated track.

2. A railway vehicle suspension system as claimed in claim 1 wherein said center truck pivotal connection to said two guide trucks comprises a first drawbar between said first of said two guide trucks and said center truck and a second drawbar between said center truck and said second guide truck.

3. A railway vehicle suspension system as claimed in claim 2 wherein said guide trucks each include a sliding means mounted between said fluid springs and said superstructure.

4. A railway vehicle suspension system as claimed in claim 3 wherein said rate-of-turn sensing and tilt determining means are mounted from each said drawbar to said center truck.

5. A railway vehicle suspension system as claimed in claim 4 wherein the tilt determining means comprises valving for controlling fluid pressure in said fluid springs, means for integrating signals generated by said rate-of-turn sensing means and means for supplying fluid pressure to said fluid springs.

6. A railway vehicle suspension system as claimed in claim 5 wherein said first and said second drawbars are provided with cushioned means for absorbing shock between said center truck and each said guide trucks.

7. A railway vehicle suspension system for supporting a vehicle superstructure comprising in combination:
   a center truck supporting said superstructure and connected thereto by center truck fluid controlled springs means permitting lateral tilting of said superstructure;
   a forward and an aft guide truck, each carrying guide truck adjustable spring means, located at spaced relationship from each end of said center truck for supporting said superstructure forward an aft end respectively by sliding means;
   a frist drawbar means pivotally connecting said forward guide truck to said center truck and a second drawbar means pivotally connecting said aft guide truck to said center truck;
   rate-of-turn sensing means disposed between said first and second drawbar means and said center truck at a location for sensing pressure variations which are indicative of rate of horizontal pivotal change of said drawbar versus said center truck;
   receiving means connected to said rate-of-turn sensing means for receiving said rate-of-turn sensing means sensed pressure variations; and
   actuating means connected between said receiving means and said fluid controlled spring means of said center truck and guide trucks for controlling said springs force per received pressure variations so that said superstructure center of gravity is displaced whereby associated centrifugal forces on said superstructure are continuously balanced out during travel of said vehicle.

8. A railway vehicle suspension system as claimed in claim 7 wherein:
   said center truck includes wheelbase varying at the most between one and five times said associated track gauge and wherein said wheelbase includes at least four independently suspended wheels; and
   each said guide truck includes two or more independently suspended wheels while said sliding means for supporting said superstructure includes a stack of resilient and rigid support disks centerly pinned onto said guide truck.

* * * * *